United States Patent [19]

Green et al.

[11] Patent Number: 5,212,904

[45] Date of Patent: May 25, 1993

[54] FERTILIZING APPARATUS

[75] Inventors: James L. Green, Corvallis, Oreg.; Bruce A. Briggs; Doris L. Briggs, both of Olympia, Wash.

[73] Assignee: State of Oregon acting by and through the State Board of Higher Education on behalf of Oregon State University, Eugene, Oreg.

[21] Appl. No.: 748,854

[22] Filed: Aug. 23, 1991

Related U.S. Application Data

[63] Continuation-in-part of Ser. No. 446,230, Dec. 4, 1989, Pat. No. 5,117,581.

[51] Int. Cl.$^5$ .............................................. A01G 29/00
[52] U.S. Cl. ........................................ 47/48.5; 47/25; 47/32
[58] Field of Search ...................... 47/9 S, 25, 32, 48.5

[56] References Cited

U.S. PATENT DOCUMENTS

| 349,874 | 9/1986 | Buhrer . | |
| 1,280,486 | 10/1918 | Kanst | 47/48.5 |
| 1,490,865 | 4/1924 | Van De Velde | 47/48.5 |
| 1,791,873 | 2/1931 | Neiman . | |
| 1,931,602 | 10/1933 | Colman | 47/25 |
| 1,948,117 | 2/1934 | Kadow | 47/48 |

(List continued on next page.)

FOREIGN PATENT DOCUMENTS

| 70858 | 6/1992 | Fed. Rep. of Germany . |
| 969317 | 12/1950 | France . |
| 412853 | 7/1934 | United Kingdom . |
| 2095083A | 9/1982 | United Kingdom . |
| 2137464A | 10/1984 | United Kingdom . |

OTHER PUBLICATIONS

Whitcomb et al., "An Insulated Pallet to Reduce Labor Costs and Temperature Stress in Container Plant Production," International Plant Propagation Society (1984), pp. 500-506.

"The Insulated Pallet," Plant Productin in Containers, Laceback Publications (1984), pp. 488-494.

Balligand et al., "Experience Gained in France on Heat Recovery From Nuclear Plants for Agriculture and Pisciculture," *Nuclear Technology*, 38:90-96 (1978).

Buclon, "Heating of Greenhouses Using Plastics Ducts on the Ground," *Plasticulture*, 27:33-37 (1975).

Dubois, "Flexible Tube Soil Heating," *Plastics in Agriculture*, Applied Science Publications, pp. 111, 113 (1978).

Ball, "Labor Saving at Burnaby Lake," *Grower Talks*, pp. 20-24, (Sep. 1983).

"Ebb & Flow Makes Profits Grow," *Grower Talks*, p. 123 (May 1989).

"Growth by Design," Van Wingerden advertisement, *Grower Talks*, p. 53 (May 1989).

"Lerio's 1989 New Product Line-Up," advertisement, *Amer. Nurseryman*, p. 169 (Mar.-Apr. 1989).

"Plasti-Vac 3-in-1 Watering Tray," advertisement, *Grower Talks*, p. 52 (May 1989).

"Introducing a Major Innovation in Self-Watering Plant Pots," decor advertisement, *Horticulture*, 67:9 (Sep. 1989).

van de Werken, "A New Way With Containers," *Amer. Nurseryman*, pp. 43-51 (Jul. 1989).

Primary Examiner—Henry E. Raduazo
Attorney, Agent, or Firm—Klarquist, Sparkman, Campbell, Leigh & Whinston

[57] ABSTRACT

The fertilizing apparatus comprises a diffusion member having a porous member associated with it to retain fertilizer inside a compartment defined by the diffusion member. The diffusion member provides a diffusion pathway that is protected from gravitational water flow and rapid temperature fluctuation. The compartment is filled with fertilizer and inserted into growth media adjacent a plant's root system so that the diffusion pathway is substantially occupied by the plant growth media. A plurality of diffusion members, each member having a different length, may be used to establish diffusion times for specific fertilizer formulations. The fertilizing apparatus can be adapted for use with a closed, insulated pallet system for producing container-grown plants.

23 Claims, 6 Drawing Sheets

U.S. PATENT DOCUMENTS

| | | | |
|---|---|---|---|
| 2,567,706 | 9/1951 | Hannum et al. | 229/3.5 |
| 3,106,801 | 10/1963 | Risacher | 47/17 |
| 3,147,569 | 9/1964 | Murguia | 47/37 |
| 3,304,653 | 2/1967 | Zacarnowski | 47/48.5 |
| 3,345,774 | 10/1967 | Delbuguet | 47/48.5 |
| 3,686,792 | 8/1972 | Barfield | 47/39 |
| 3,757,469 | 9/1973 | Smith et al. | 47/48.5 |
| 3,857,195 | 12/1974 | Johnson | 47/9 S |
| 3,870,583 | 5/1975 | Gidge | 47/48.5 |
| 3,955,319 | 5/1976 | Smith | 47/9 S |
| 3,998,006 | 12/1976 | Riedel | 47/9 S |
| 4,056,898 | 11/1977 | Brucato et al. | 47/48.5 |
| 4,161,193 | 7/1979 | Freychet et al. | 138/103 |
| 4,177,604 | 12/1979 | Friesen | 47/62 |
| 4,183,176 | 1/1980 | Barfield | 47/79 |
| 4,211,037 | 7/1980 | Green | 47/80 |
| 4,226,048 | 10/1980 | Molnar | 47/62 |
| 4,242,835 | 1/1981 | Sorribes | 47/84 |
| 4,279,101 | 7/1981 | Leroux | 47/64 |
| 4,287,682 | 9/1981 | Browne | 47/81 |
| 4,453,343 | 6/1984 | Grimes, Sr. | 47/48.5 |
| 4,531,324 | 7/1985 | Yang et al. | 47/81 |
| 4,546,571 | 10/1985 | Scrivens | 47/81 |
| 4,584,791 | 4/1986 | Wolf | 47/62 |
| 4,627,191 | 12/1986 | Bergere | 47/25 |
| 4,729,189 | 3/1988 | Whitcomb | 47/39 |
| 4,995,192 | 2/1991 | DeWid | 47/30 |
| 5,022,182 | 6/1991 | Anderson | 47/48.5 |

FERTILIZING APPARATUS

This application is a continuation-in-part of U.S. patent application Ser. No. 07/446,230, filed Dec. 4, 1989, now U.S. Pat. No. 5,117,581 issued Jun. 2, 1992 herein incorporated by reference.

TECHNICAL FIELD

This invention is directed to a fertilizing apparatus that provides a fertilizer diffusion pathway that prevents fertilizer loss as leachate in gravitational water flow. The fertilizing apparatus can be used in conjunction with a closed, insulated pallet system for the production of container-grown plants.

BACKGROUND INFORMATION

Production solutions, such as water and liquid fertilizers, are generally applied to container grown plants having open root zones (that is, an open top surface and a draining bottom surface). Production solutions may be applied either to the top surface of the open root zone by overhead irrigation or drip irrigation techniques, or to the bottom surface of the root zone by capillary or sub-irrigation techniques.

Precipitation or production solutions applied to top surfaces may dissolve fertilizer placed on top of or incorporated into plant growth media. Surface-applied water flows by gravity through the container, carrying the fertilizer away as leachate before the fertilizer can be used by the plant roots. Accordingly, much fertilizer is wasted.

SUMMARY OF THE INVENTION

The present invention is directed to a fertilizing apparatus, a preferred embodiment of which has an insulating water-impermeable tubular diffusion member and a porous member that retains fertilizer inside the diffusion member. The diffusion member may be straight or may include a smooth curve, a right curve, or one or more acute-angle curves therein. The diffusion member creates a protected diffusion pathway. Fertilizer diffuses through the diffusion pathway and into contact with a plant's root system. The diffusion member protects the diffusion pathway from gravitational water flow and rapid temperature fluctuation.

In another embodiment, a fertilizing apparatus has a slightly crowned top and downwardly depending sides to protect the diffusion pathway from temperature fluctuation and gravitational water flow.

The apparatus of the present invention is functional with either a unitary tubular diffusion member or with a plurality of tubular diffusion members arranged concentrically or adjacent to one another. Furthermore, the diffusion members can be placed in plant growth media either in a vertical or a horizontal orientation. The horizontal orientation facilitates root contact with the diffusing fertilizer and is, therefore, a preferred embodiment.

When a plurality of diffusion members are used, the length of each diffusion member can be varied to vary fertilizer diffusion times. The fertilizing apparatus can be readily re-filled and re-used and includes a fastening system that secures the apparatus to a plant container.

The apparatus of the present invention may be used in conjunction with a closed, insulated pallet system to facilitate the production of container-grown plants. The apparatus of the present invention may also be used in a traditional, open container to shield the diffusing fertilizer from gravitational water flow.

DETAILED DESCRIPTION OF PREFERRED EMBODIMENTS

Figures 1, 2:
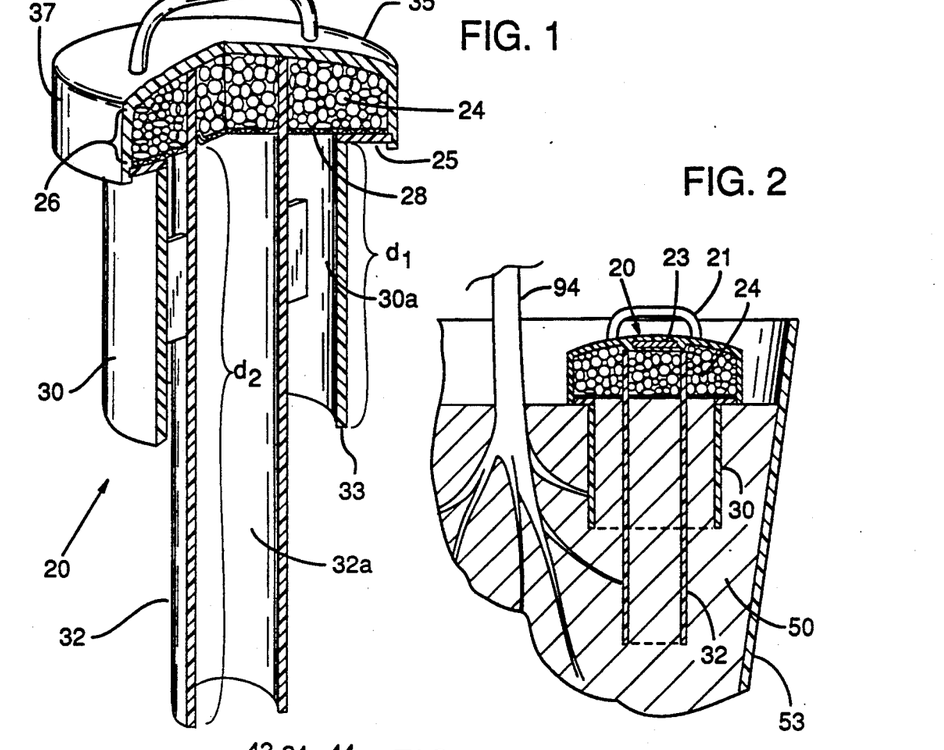
FIG. 1 is a perspective sectional view of a fertilizing apparatus having two concentrically arranged tubular diffusion members.
FIG. 2 is a side sectional view of the fertilizing apparatus of FIG. 1 inserted into the growth media of a container-grown plant.

The fertilizing apparatus shown in FIG. 1 includes a compartment 26 having a top 35 and side 37. A thin, porous member 28 defines the bottom of the compartment. Two concentrically arranged tubular diffusion members 30, 32 extend downwardly from the compartment 26. The larger tubular diffusion member 30 includes a flange 25, the edge of which snaps into a groove formed in the bottom inside edge of the side 37. Fertilizer formulations 24 are placed inside the compartment 26 on porous member 28.

FIG. 2 shows fertilizing apparatus 20, containing fertilizer 24, inserted into growth media 50 adjacent a plant's root system. Growth media 50 thereafter substantially occupies the interior cavities or diffusion pathways 30a and 32a of diffusion members 30 and 32.

The fertilizer 24 gradually permeates through porous member 28 to diffuse through the plant growth media 50. The porous nature of member 28 facilitates moisture transfer and root penetration into the fertilizer compartment 26.

The porous member 28 can be formed from a variety of materials including wire mesh. Porous member 28 may also be a permeable membrane such as nylon, polypropylene (for instance, spun-bonded poly(propylene) from Kimberly-Clark) or cellulose. One skilled in the art will realize that any of a variety of retaining members, such as porous member 28, can be used to retain fertilizer 24 inside the compartment yet allow the fertilizer 24 to diffuse through the member and into growth media 50.

Porous member 28 may be attached by any suitable means, such as bonding, to the compartment 26 and diffusion members 30, 32.

In order to provide a diffusion pathway protected from gravitational water flow and rapid temperature fluctuation, the fertilizing apparatus is made of an opaque, insulating, moisture-impermeable material. A preferred embodiment of the fertilizing apparatus is made from poly(vinyl chloride) or poly(styrene).

Fertilizer compartment 26 includes slightly-crowned top 35. Top 35 is water impermeable and sheds precipitation or surface-applied production solutions. Water-impermeable top 35 may also include a handle 21 that can be easily grasped by an operator or a mechanical device. Alternatively, a magnetic member 23 (FIG. 2) can be imbedded in the top 35, which top may or may not include the handle 21. A magnetic device is then used to attract magnetic member 23 in top 35 to remove the apparatus from growth media 50.

As noted, the top 35 may be removably attached to the tubular diffusion member 30. Alternatively, the top 35 could be threaded to a diffusion tube or simply rest on top of tubular diffusion members 30 and 32. Also, top 35 may be hinged to the tubular member 30 to provide a flip top. Preferably, the top 35 is attached to allow access to the compartment 26 for refilling with fertilizer 24.

The dimensions of the tubular diffusion members such as 30 and 32 may vary and are selected to be compatible with the fertilizing needs of the plant and the dimensions of the plant container. Factors to be considered when selecting the dimensions of the fertilizing apparatus include the diameter of the plant container, the distance from the sidewall of the plant container, and the depth the root system penetrates growth media 50. For instance, if the fertilizing apparatus is used in a one-gallon container, the maximum distance between the container edge and the centered plant stem is approximately two inches. In such a container, therefore, the apparatus would be less than two inches wide. If the fertilizing apparatus is used in a production bed, the horizontal dimension of the tubular diffusion members will be determined by the plant spacing in the bed.

The cavities enclosed by the tubular diffusion members define diffusion pathways 30a, 32a through which fertilizer 24 diffuses. Each diffusion pathway has a particular diffusion distance and fertilizer diffusion time associated therewith.

For example, FIG. 1 shows fertilizing apparatus 20 having diffusion members 3C and 32 arranged concentrically so that fertilizer 24, diffusing through porous member 28, enters diffusion pathways 30a or 32a. Diffusion pathways 30a and 32a have corresponding diffusion distances d1 and d2. Diffusion distances d1 and d2 can be equal; however, a preferred embodiment is to vary the diffusion distances to provide particular diffusion times, t1 or t2. Diffusion times t1 and t2 are defined as the time required for diffusing fertilizer 24 to diffuse through the diffusion pathways 30a and 32a and into the gravitational water flow pathwa.y immediately beneath the tubes.

Varying the length of the diffusion members allows a worker to determine a particular fertilizer diffusion time. For example, a fertilizer "starter" formulation might diffuse down outer concentric tubular member 30 of fertilizing apparatus 20. Diffusion tube 30 has the shortest diffusion distance d1 and the shortest fertilizer diffusion time t1. "Finish" fertilizer formulations, such as phosphate formula&:ions, might be placed inside fertilizer compartment 26 so as to diffuse down diffusion pathway 32a of inner diffusion member 32. Diffusion pathway 32a has the longest diffusion distance d2, and the longest fertilizer diffusion time t2.

A worker can also use adjacently arranged diffusion members to determine fertilizer diffusion times. Fertilizing apparatus 22, shown in FIGS. 3 and 4, includes two adjacently arranged tubular diffusion members 36, 38. A porous member 39, 41 is located on top of each member 36, 38. A top 42, 44 fits over each member 36, 38. Tubular diffusion members 36 and 38 extend downwardly from tops 42 and 44 to define diffusion pathways 36a and 38a through which fertilizer 24 diffuses into contact with a plant's root system.

Fertilizer 24 may be any fertilizer formulation. However, without limitation, the following fertilizers, or mixtures thereof, are typically used with the fertilizing apparatuses: phosphorous, potassium, magnesium, nitrogen (such as ammonium, nitrate or urea-based fertilizers) and chelated trace elements. Fertilizer 24 may also be a controlled release fertilizer (CRF) that is coated with a permeable plastic resin, such as that sold under the trademark Osmocote. CRFs are used to further retard the diffusion of the fertilizer throughout the diffusion pathways. Fertilizers coated with sulfur and other materials to delay fertilizer dissolution or diffusion may also be used.

The diffused fertilizer ions are primarily removed from vertically oriented fertilizing apparatuses, such as apparatuses 20 and 22 (FIGS. 2-4) by root uptake. The root system may grow directly under the fertilizing apparatus and intercept the fertilizer ions as they diffuse from beneath the tubular diffusion members. Fertilizer ions diffusing from the vertical tubular diffusion members are typically intercepted by the roots before the ions are lost as leachate to gravitational water flow. Potential root-fertilizer contact can be increased primarily by increasing the horizontal dimensions of the tubular diffusion members.

Figure 5:
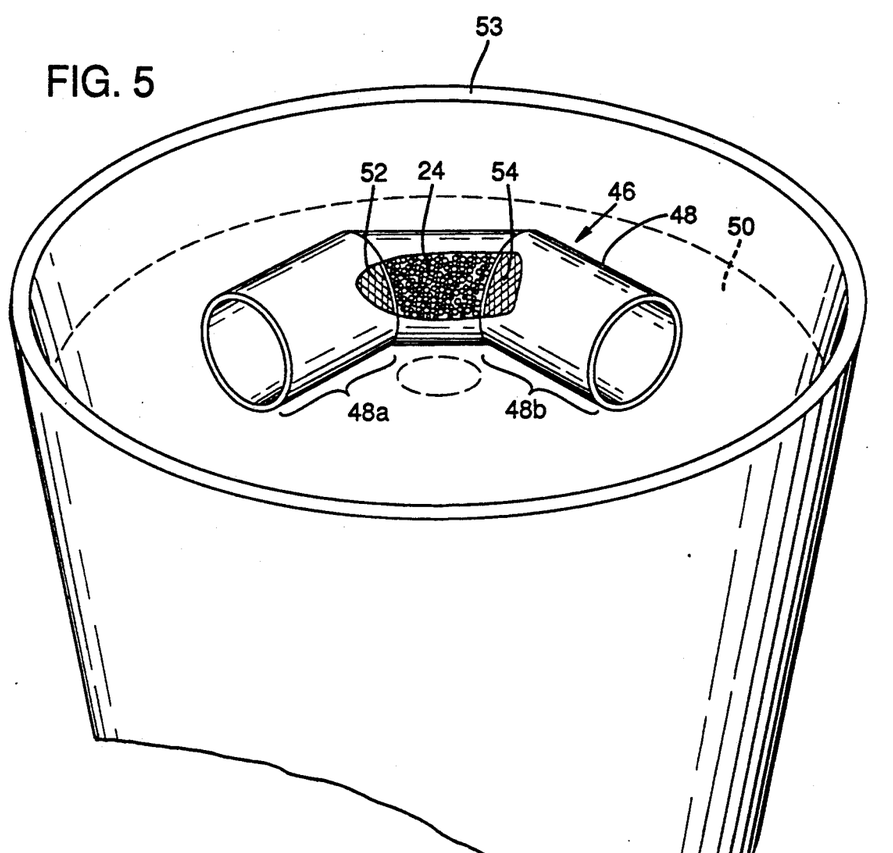
FIG. 5 is a perspective view of an alternative embodiment of a fertilizing apparatus.
Figure 6:
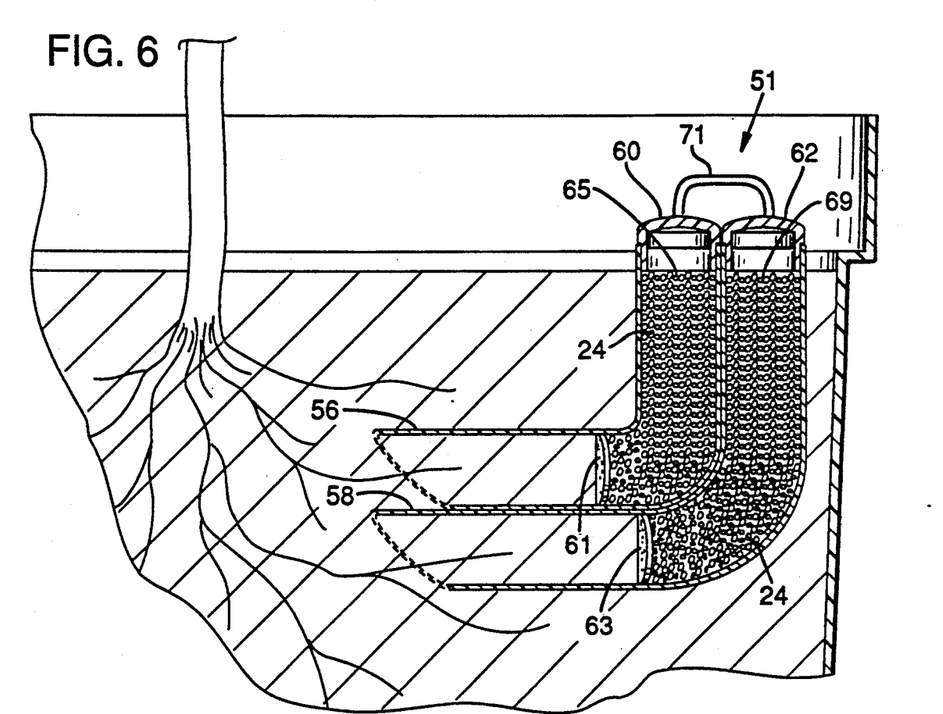
FIG. 6 is a side sectional view, of another alternative embodiment of a fertilizing apparatus, shown inserted into the growth media of a contained plant.

FIGS. 5 and 6 show alternative embodiments of the fertilizing apparatus. The elongated diffusion members of the alternative embodiments may include smooth curves, may have one right angle curve, or may have one or more acute-angles formed therein. For example, fertilizing apparatus 46 (FIG. 5) comprises a diffusion tube or tubes having two acute angles therein. Fertilizing apparatus 46 may also comprise a smooth curve. The fertilizing apparatus 46 is designed to conform to the internal shape of plant container 53.

Fertilizing apparatus 46 has two porous members 52 and 54 that retain between them fertilizer 24 inside the apparatus 46. Diffusion tube 48 and porous members 52 and 54 define protected diffusion pathways 48a and 48b. Growth media 50 substantially completely occupies diffusion pathways 48a and 48b when fertilizing apparatus 46 is inserted into media 50 in a horizontal orientation. Typically, apparatus 46 is completely covered with media 50 to maximize the thermal buffering attributes of the apparatus. Fertilizer 24 diffuses through both pathways 48a and 48b into contact with the plant's root system. The horizontal orientation of fertilizing apparatus 46 also permits the plant's root system to grow into pathways 48a and 48b and thus facilitates root uptake of fertilizer 24.

Fertilizer apparatus 51 (FIG. 6) can be inserted into growth media 50 so that lower ends of diffusion tubes 56 and 58, having a right-angle bend therein, are oriented horizontally. Root uptake of fertilizer 24 from apparatus 51 occurs in the same manner as with fertilizing apparatus 46.

Fertilizing apparatus 51 may include opaque, water-impermeable tops 60 and 62. Porous members 61, 63 are positioned near the bend in tubes 56, 58. The tops 60, 62 and porous members 61, 63 define compartments 65, 69 that are analogous to compartment 26 of apparatus 20. Tops 60 and 62 may be removably attached to the diffusion tubes 56 and 58 in the same manner as the attachment of top 35 to diffusion members 30 and 32. The tops 60 and 62 may also include removing means such as a handle 71 and an imbedded magnetic member (not shown).

Fertilizing apparatuses with horizontal diffusion members, such as apparatuses 46 and 51, facilitate fertilizer contact with the root system. Primary roots of a plant typically grow downwardly. However, secondary or tertiary root systems typically grow horizontally. Horizontal, nonlinear diffusion tubes 48, 56 and 58 allow the root system to penetrate the diffusion zone simply by growing in a normal, horizontal plane.

The material occupying the diffusion members can influence the fertilizer diffusion rate. This material can be plant growth media 50. The diffusion members may also be filled with material other than growth media 50 such as vermiculite, vermiculite-peat, or synthetic resins. These materials are selected to influence the fertilizer diffusion rate through the diffusion pathway by considering several factors, including: the volumetric water content; the tortuosity, such as bulk density; and the buffering capacity, such as increasing the concentration of ions with slow diffusion rates or increasing the cation exchange capacity.

Also, subtending layers of various growth media formulations 50 can be placed inside the diffusion tubes to influence diffusion rate. Large particle growth medium located immediately below fertilizer compartment 26 of fertilizing apparatus 20 (FIG. 1) would primarily retain absorbed water. If each subtending layer of growth medium has a finer texture than the preceding layer, with the lowest layer having a finer texture than the growth media 50 in which the plant is grown, then the growth media gradient would retard the diffusion of fertilizer from fertilizer compartment 26 into the diffusion pathways. Subtending layers of growth media also establish positive movement of moisture into the fertilizer apparatuses and therefore promote the diffusion of fertilizer 24 into the diffusion pathways.

Figure 3:
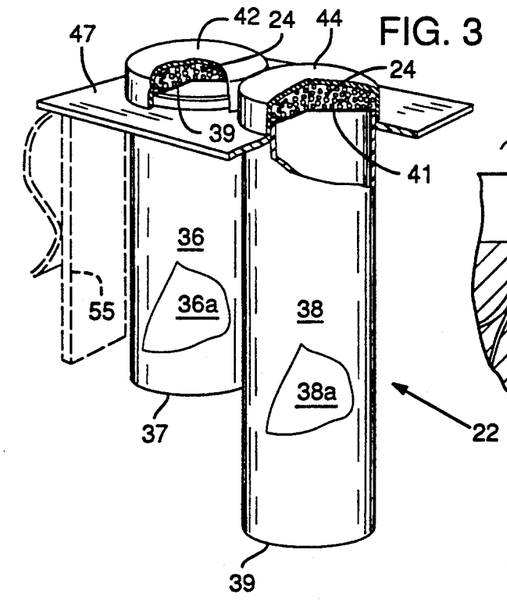
FIG. 3 is a perspective sectional view of the fertilizing apparatus having adjacently arranged diffusion members.
Figure 4:
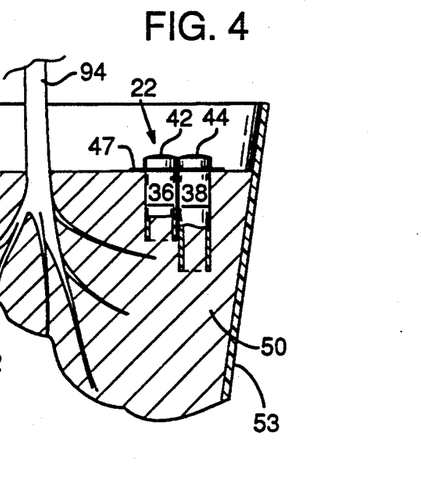
FIG. 4 is a side view of the fertilizing apparatus of FIG. 3 inserted into the growth media of a container-grown plant.

The fertilizing apparatuses 20, 22, and 51 may include a holder 47, such as that shown in FIGS. 3 and 4. The holder 47 is a flat plate with holes formed to permit a diffusion member 36, 38 to protrude therethrough, but not the cap 42, 44. The holder 47 prevents the apparatus 22 from sinking into the plant media 50. The holder 47 can be equipped with container fastening means 55 to secure holder 47 to a plant container 53. The fastening means can be of any conventional nature including, without limitation, a spring clip (such as shown in dashed lines in FIG. 3), screw-type fastening means and adhesive-type fastening means.

Figure 7:
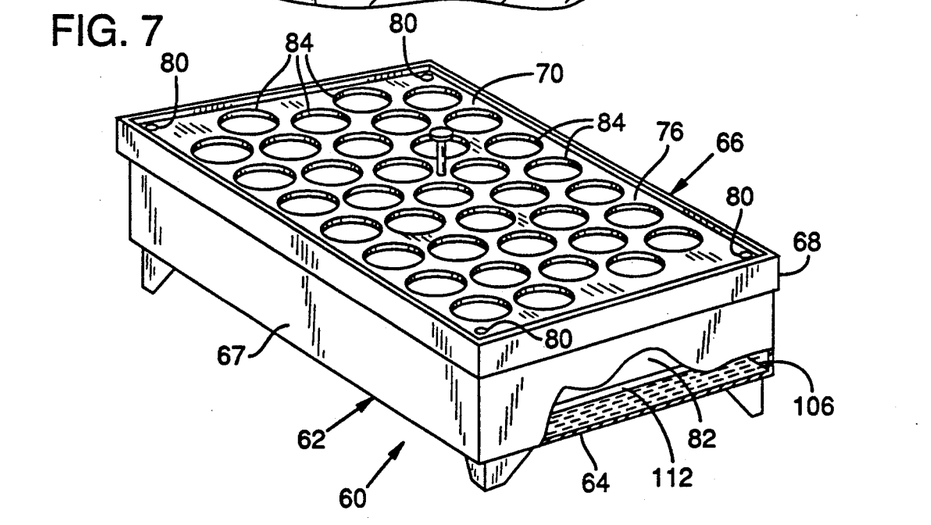
FIG. 7 is a perspective view of part of an insulated, closed pallet that may be used with an alternative embodiment of the present invention.
Figure 8:
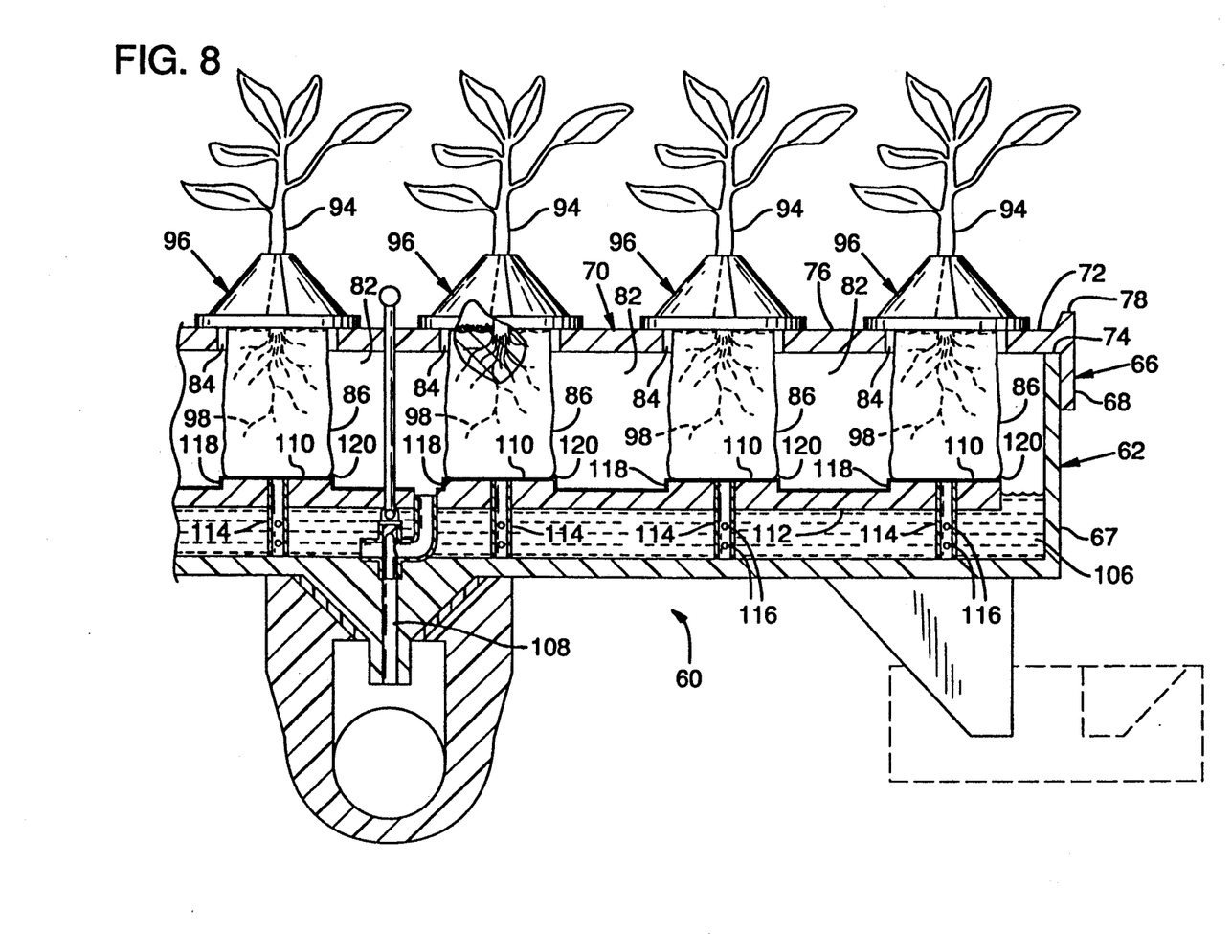
FIG. 8 is a side view, in partial cross-section, of the pallet of FIG. 7 showing plant containers inserted therein.

The fertilizing apparatuses can be used in conjunction with a pallet system for producing container-grown plants. As shown in FIGS. 7 and 8, pallet 60 generally includes a box-shaped base 62 formed of a lightweight, durable, opaque material, such as polystyrene. The bottom wall 64 of the base is substantially flat.

Sidewalls 67 of base 62 extends upwardly from bottom wall 64 and supports a cover 66. The pallet cover 66 includes a flat top 70 that has sides 68 extending downwardly from the edges of the top 70. Sides 68 of top 70 fit over the upper ends of base sidewalls 67. Preferably, an inwardly projecting lip 72 (FIG. 8) is formed in each side 68 of cover 66 to rest upon upper ends 74 of base sidewalls 67.

The sides 68 of the cover 66 extend upwardly above the upper surface 76 of the pallet top 70 to define a peripheral ridge 78. The ridge 78 serves to direct any run-off (such as rain water) on the upper surface 76 toward drains 80 that are formed through the top 70 at each corner of the cover 66. Preferably, the upper surface 76 is slightly crowned for directing water to the corner drains 80. Each drain 80 is S-shaped and extends completely through the top 70 of the cover 66 to direct run-off into a water reservoir 106 defined in the base 62 of the pallet 60 (FIG. 8). The S-shape of the drains 80 prohibits light from entering the root compartment 82.

A plurality of spaced apart holes 84 are formed through the top 70 of the pallet cover 66. The holes 84 are configured to support plant containers 86 (FIG. 8) in a manner such that the containers 86 are disposed substantially within the root compartment 82 of the pallet 60.

A preferred plant container 86 generally comprises a non-woven, spunbonded polypropylene) having an inner coating of copper hydroxide. Other possible containers include perforated, thin, flexible plastic pouches, (FIGS. 8, 9 and 11), plastic pots, closely woven poly(propylene) strands, and other water- and air-permeable materials that retain roots within the pouch such as cellulose or copper-treated burlap. The container 86 is perforated with a multitude of pores 89 (FIG. 11) that are sized to permit air and water flow therethrough but restrict root penetration through the pouch. The container size is selected to best fit the shape of the root system of the particular contained plant and is deformable to allow for root growth. Preferably, the container 86 is filled with a suitable growth medium, such as a mixture of peat and vermiculite.

Figures 9, 10:
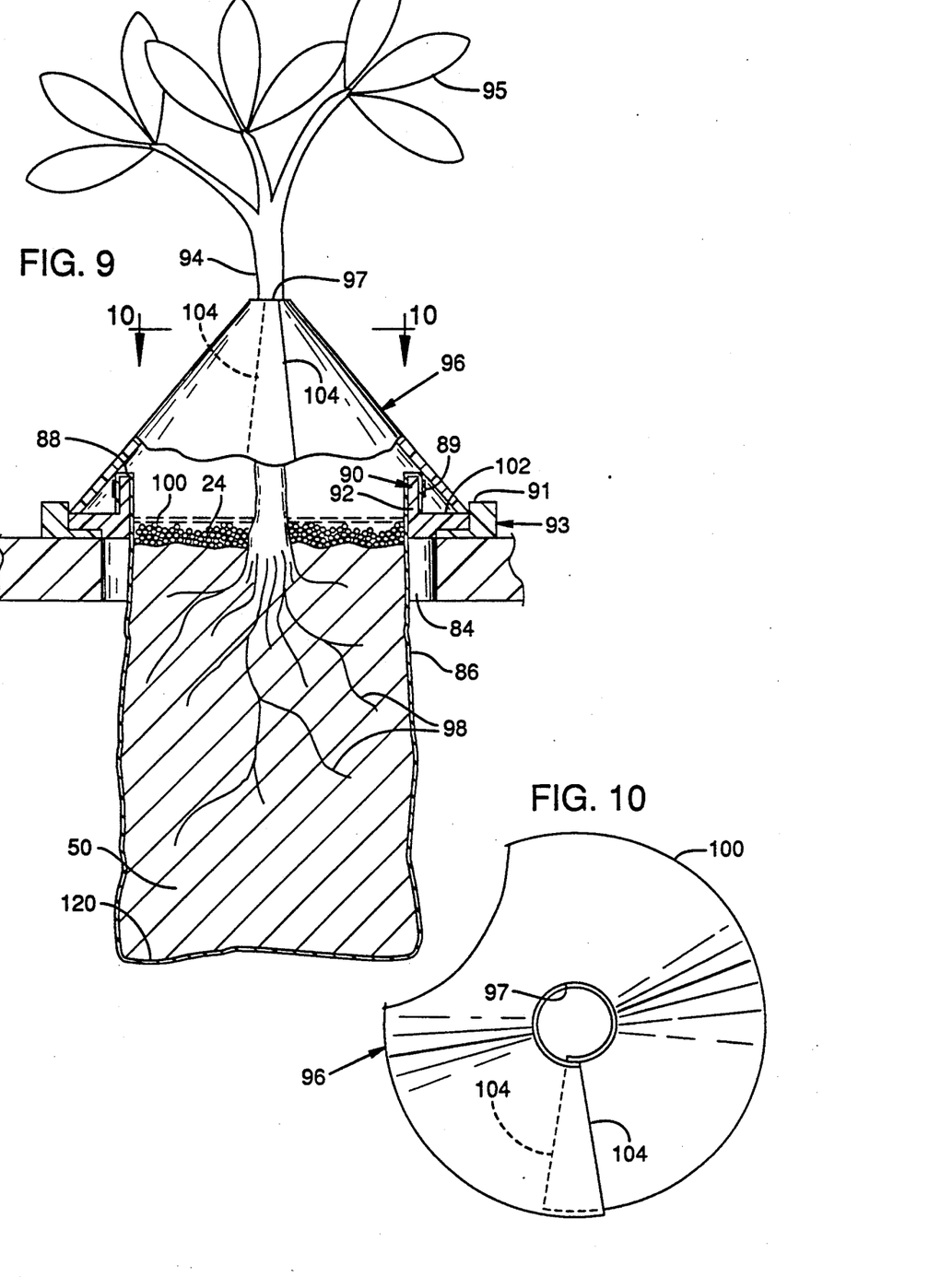
FIG. 9 is a side sectional view, showing a collar used to cover the upper end of a plant housed in a plant container.
FIG. 10 is a top view of the collar of FIG. 9 taken along line 10—10 of FIG. 9.

The open end 88 of each container 86 is connected to an annular holder 90 (FIG. 9). Each holder fits within a seat 93 fastened around the edge of each hole 84 formed in the top 70 of the pallet cover 66. The upper section 92 of the holder 90 extends upwardly, slightly above the upwardly projecting part 91 of the seat 93. The open end 88 of the container 86 passes through the center of the holder 90 and is wrapped over the upper section 92 to be secured thereto by a removable elastic band 89 that is stretched around the outer wall of the upper section 92.

As best shown in FIG. 9, the containers 86 are secured by holders 90 so that the plant trunk 94 and foliage 95 extend above the upper surface 70 of the pallet 60. The contained roots 98 are held in the root compartment 82. As one aspect of the present invention, the plant roots 98 and trunk 94 are projected from the deleterious effects of extreme changes in ambient air temperature. To this end, the top 70 and sides 68 of the pallet cover 66 have a durable, water impermeable, light reflecting opaque outer layer, such as polyurethane, lined with a closed-cell insulating material, such as closed-cell polystyrene. The preferred thickness of the insulating material is in the range of approximately 1 cm to 10 cm.

The roots 98 near the open end 88 of the container 86 and the base of the plant trunk 94 are insulated by a collar 96 (FIGS. 8 and 9) that rests upon the holder 90. The collar 96 surrounds the trunk 94 and substantially covers the open end 88 of the container 86. The collar 96 is a flexible plastic member having a generally circular shape in top plan view (FIG. 10) and presenting a truncated cone shape in side elevation view (FIG. 9). The top aperture 97 in the collar 96 surrounds the trunk 94 of the plant. The bottom rim 100 of the collar rests upon the rim 102 on the holder and abuts the upwardly projecting part 91 of the seat 93.

Collar 96 is formed of light-impermeable plastic that is lined on its inner (i.e., plant-facing) surface with suitable insulating material, such as styrofoam. Preferably, the collar 96 is formed as a single piece with overlapping, unattached ends 104. This construction of the collar 96 permits the ends 104 to be moved apart or together to adjust the size of the collar base 100 and aperture 97 to correspond to the size of the container hole 84 and plant trunk 94, respectively.

It is noteworthy that, in addition to its insulating properties, the collar 96 prohibits light from reaching the growth medium near the open end 88 of the container 86. Accordingly, weed growth within the container 86 is inhibited. Moreover, the collar 96 provides a shield to protect the plant roots 98 from invasive insects. It is also noteworthy that the collar 96 is shaped to support the plant trunk 94 so that the plant is less likely to be damaged by wind.

The collar 96 prevents loss of evaporation moisture from the container so that salt accumulation at the surface of the growth medium or at the plant stem is prevented. It is also noteworthy that the collar prevents aerial-applied water, such as rain, from contacting the top surface of the growth medium, thereby preventing downward leaching that would disturb the stable gradients (equilibria) in the root zone. Collar 96 thus protects from gravitational water flow fertilizer 24 that may be placed on top of the growth media. In this regard, the collar functions in a manner such as the fertilizing apparatuses 20 and 22 described in detail above.

The water reservoir 106 shown in FIG. 8 provides a water source for capillary irrigation of the plants. Moreover, the water reservoir 106 serves an important insulating function by damping or minimizing the transfer of heat into and out of the root compartment 82.

The reservoir 106 is defined between the sidewalls 67 of the pallet base 62 and covers the bottom wall 64. Water is supplied to the reservoir from a water supply/drain pipe 108 that extends beneath the pallet 60. The water reservoir 106 provides a water source for capillary-type root irrigation of the plant containers 86. To this end, the root compartment 82 of the pallet includes a capillary mat 110 (see FIG. 8) supported between the top 70 and bottom wall 64 of the pallet 60. More particularly, a support platform 112 of rigid plastic, such as 0.5 cm thick polystyrene, is held above the reservoir bottom wall 64 by cylindrical support tubes 114 that extend downwardly from the underside of the support platform 112 to rest upon the pallet bottom wall 64. The support tubes 114 are positioned so that one support tube is beneath each hole 84 in the pallet top 70. Preferably, the support tubes 114 are formed with openings 116 extending through the tube walls for conducting upward movement of water through the support tubes 114, as described more fully below.

The capillary mat 110 is approximately 0.5 cm thick and formed of any suitable high-capillarity material, such as non-woven polyester fibers. One suitable capillary mat is that manufactured by Pellon Corporation under the trademark WATER MAT. The mat 110 is placed over the top of the support platform 112. The support platform 112 has a raised portion 118 underlying each hole 84 in the pallet top 70. Preferably, the plant containers 86 and the support tubes 114 are sized so that the bottom 120 of the container 86 will rest upon the portion of the capillary mat 110 that covers the raised portion 118 of the support platform 112.

The support tubes 114 are filled with a high-capillarity wicking material, such as a porous poly(urethane) material or perlite. Consequently, water in the reservoir 106 passes through the openings 116 in the support tubes 114 and is wicked by the wicking material within the tube 114 to the capillary mat 110, where it is drawn by the capillarity of the growth medium in the porous container 86 to supply the roots 98.

The entire root compartment 82 of the pallet 60 is initially filled with water in order to saturate the interior of the plant containers 86 and the capillary mat 110 to thereby establish capillarity. After a time sufficient to allow the pallet 60 to be filled with water, the inflow of water through pipe 108 is discontinued. The supply/drain pipe 108 is then used for removing excess water from the pallets.

As mentioned earlier, the water in the reservoir 106 serves an important function of insulating the bottom of the pallet 60. In this regard, the volume of water within the reservoir serves as a heat source or heat sink in order to buffer changes in the air temperature surrounding the pallets. As is known in the art, container-grown plants that are not subjected to extreme temperature changes will be generally healthier and larger than plants that were subjected to such changes.

Figure 11:
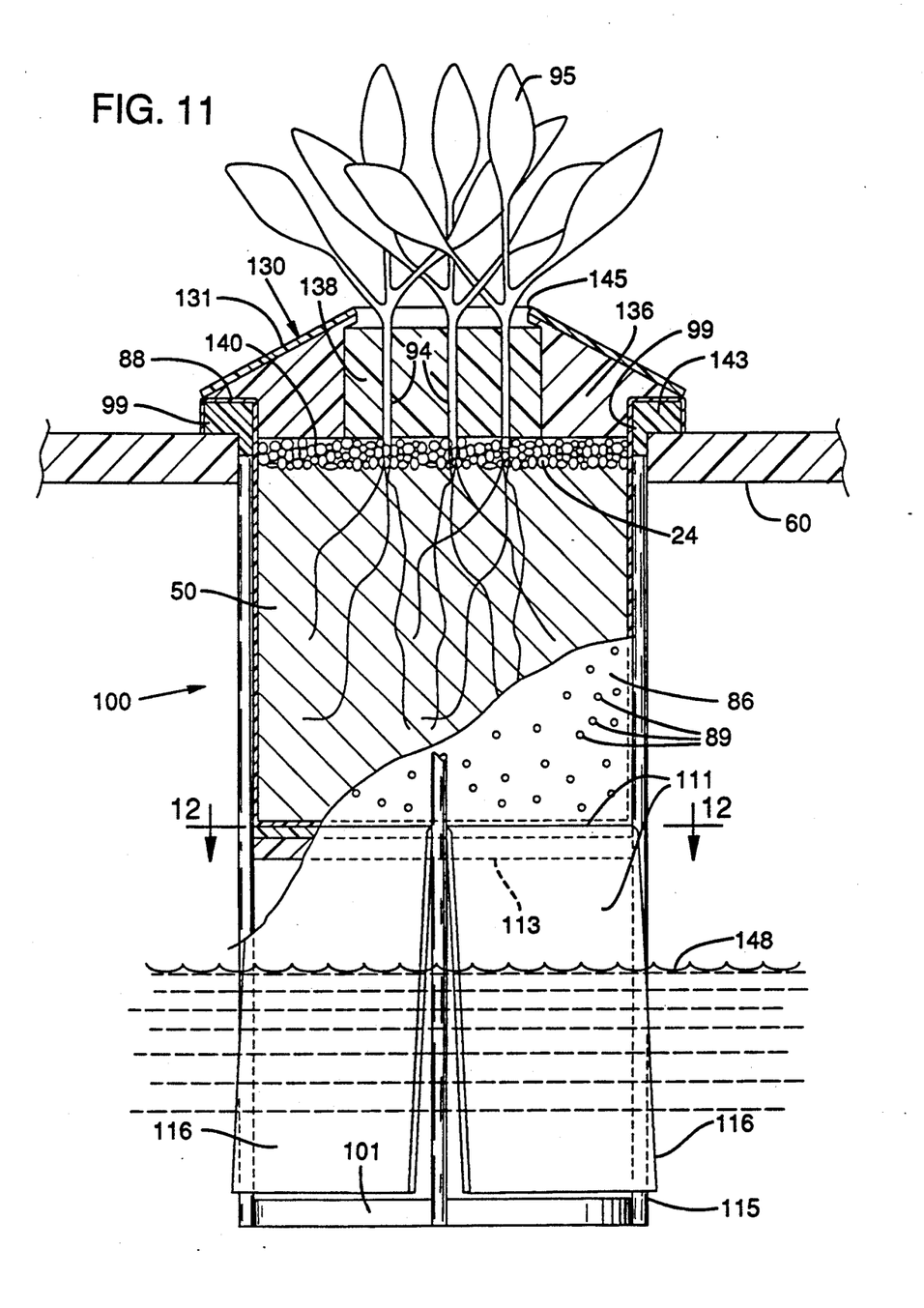
FIG. 11 is a side sectional view of a plant container wherein fertilizer, located on the top-most layer of the growth media, is protected by an insulating, water-impermeable fertilizer cover.

FIG. 11 shows plants planted in a container 86 that is situated inside a closed, insulated pallet. Fertilizer 24 is placed on top of growth media 50 carried in the container. The fertilizer 24 is protected from gravitational water flow and temperature fluctuation by an insulating collar 130. The collar 130 includes a light-impermeable, light-reflecting top layer 131, such as poly(vinyl chloride) or like material, &hat defines in cross section (FIG. 11) a generally truncated cone. Adhered to the underside of the top layer 131 is a bottom layer 136 formed of an insulating closed-cell material such as styrofoam, poly(urethane) or other like material. The collar 130 is shaped to rest upon a generally annular top 99 of a container support basket 100 with the open end 88 of the plant container 86 secured be&.ween the top 99 and bottom layer 136 of the collar 130. Preferably, the top 99 includes a recess 143 in its underside for fitting the top around each hole 84 in the cove: 66 (see FIG. 7).

The trunks 94 and foliage 95 of plants held in the container 86 extend through the central opening 145 of the collar 130. Once the collar is in place as just mentioned, the central opening 145 is preferably filled with a sealant foam 138, such as polyurethane, which flows and expands substantially surround the trunks 94 and close the opening 145.

It will be appreciated in view of the foregoing that between the top of the growth media 50 and the collar 130 there is defined a compartment 140 in which is stored the fertilizer 24. Above the compartment, the fertilizer is protected from surface-applied liquids. Moreover, the insulating characteristics of the collar assembly just described protects both the roots and the plant trunks from temperature extremes. Further, the collar 130 minimizes weed growth by preventing sunlight from reaching the growth media surface, and supports &:he plant trunks 94 in an upright position.

Figure 12:
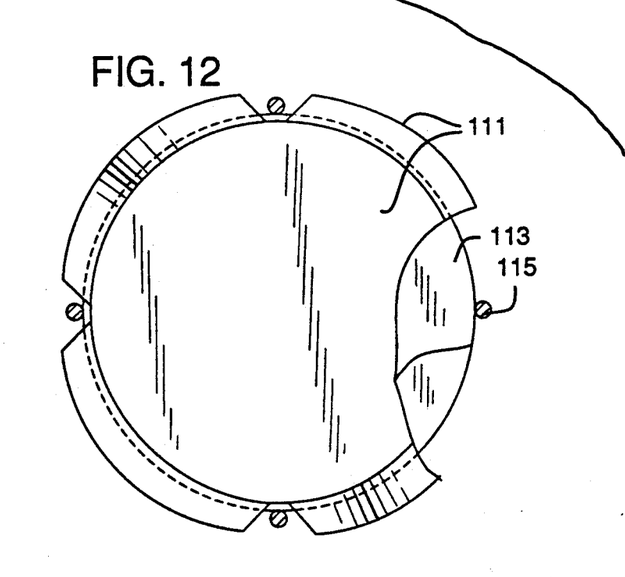
FIG. 12 is a top view of the plant container stand and capillary mat taken along line 12—12 of FIG. 11.

FIG. 11 shows the plant container 86, filled with growth media 50, resting on capillary mat 111. As shown in FIGS. 11 and 12, capillary mat 111 rests on platform 113 that is supported by support members 115, which extend between the annular top 99 of the support basket 100 and an annular bottom 101. The ends 116 of the mat 111 are draped over the platform 113 and extend beneath the water surface 148. The ends 116, therefore, draw by capillarity water from the reservoir to the portion of the mat 111 upon which the plant container 86 rests. The water and nutrients diffuse into growth media 50 through perforations 88 of plant container 86.

Although the principles of the invention have been described and illustrated with reference to preferred embodiments, it should be apparent to one of ordinary skill in the art that the invention can be further modified in arrangement and detail without departing from such principles. Accordingly, the invention is defined in terms of the appended claims and equivalents thereto.

We claim:

1. A fertilizing apparatus for fertilizing a plant that is planted in growth media comprising:
    a first moisture-impermeable diffusion member shaped to define therein a compartment and an adjacent diffusion pathway; and
    retaining means, through which dissolved fertilizer may permeate, for retaining fertilizer inside the compartment adjacent to the diffusion pathway with the diffusion member positioned above and beside the fertilizer, said retaining means contacting the growth media and the fertilizer, thereby to permit diffusion of the fertilizer through the retaining means and into the growth media.

2. The apparatus according to claim 1 wherein the first diffusion member is shaped as an elongated tubular member.

3. The apparatus according to claim 1 wherein the first diffusion member defines a diffusion pathway that is protected from gravitational water flow.

4. The apparatus according to claim 1 wherein the first diffusion member defines a diffusion pathway that is protected from temperature fluctuation.

5. The fertilizing system according to claim 1 wherein the retaining means including a porous member through which fertilizer may diffuse.

6. The fertilizing apparatus according to claim 1 wherein the first diffusion member is made of a moisture-impermeable material.

7. The apparatus according to claim 2 wherein the tubular member includes a bend formed therein.

8. The apparatus according to claim 1 including a second diffusion member shaped to define therein a second diffusion pathway, the retaining means retaining fertilizer adjacent to the second diffusion pathway.

9. The fertilizing apparatus according to claim 1 wherein the first diffusion member is made from an insulating, opaque material.

10. The apparatus according to claim 1 including a second diffusion member shaped to define therein a compartment and a second diffusion pathway, the retaining means retaining fertilizer inside the compartment and adjacent to the second diffusion pathway with the diffusion member positioned above and beside the fertilizer, said retaining means contacting the growth media and the fertilizer, thereby to permit diffusion of the fertilizer through the retaining means and into the growth media.

11. A fertilizer system for plants planted in containers so that the plant trunks and foliage extend above the surface of growth media contained in the containers, comprising:
    a moisture-impermeable cover shaped for covering at least part of the growth media in the container; and
    insulating material disposed between the cover and the growth media surface and defining between the insulating material a compartment for receiving fertilizer on top of the growth media with the cover located above and beside the fertilizer, thereby to permit dissolved fertilizer to diffuse through the growth media, the insulating material shielding the compartment from fluids applied to the container from above the container.

12. The system of claim 11 further including pallet means for supporting the container within a substantially enclosed, insulated space.

13. The system of claim 11 wherein the insulating material is arranged so that the trunks of the plants are surrounded by the insulating material.

14. A method of applying fertilizer to a plant that is planted in growth media, comprising the steps of:
    covering at least part of the growth media with an opaque, moisture-impermeable cover;
    forming the cover to surround the trunk of the plant in a manner that prevents water flow through the cover; and
    placing fertilizer between the cover and the covered part of the growth media so that the fertilizer may diffuse into the growth media.

15. The method of claim 14 further including the step of enclosing the fertilizer in a compartment having a porous part through which the fertilizer may diffuse out of the compartment.

16. A method of fertilizing a plant that is planted in growth media comprising the steps of covering a supply of fertilizer with a moisture-impermeable cover;
    containing the fertilizer beneath the cover with a porous member, through which member dissolved fertilizer may permeate;
    placing the contained fertilizer adjacent to growth media;
    defining with a moisture-impermeable member located above and beside the contained fertilizer a zone for movement of the fertilizer through the growth media;
    protection the zone from gravitational water flow through the growth media; and insulating the zone from heat transfer.

17. A method of fertilizing a plant that is planted in growth media comprising the steps of:
    covering a supply of fertilizer with a moisture-impermeable cover;
    containing the fertilizer beneath the cover with a porous member through which dissolved fertilizer may permeate;
    placing the contained fertilizer adjacent to growth media so that the porous member contacts the growth media and the fertilizer, thereby to permit diffusion of the fertilizer through the porous member and into the growth media; and defining with a moisture-impermeable member located above and beside the contained fertilizer a zone for movement of the fertilizer through the growth media.

18. The method of claim 17 including the step of regulating the time the fertilizer moves through the zone by changing the length of the defined zone.

19. The method of claim 17 wherein the containing step includes containing the fertilizer beneath the cover between two porous members through which the dissolved fertilizer may permeate.

20. The method of claim 17 including the step of placing material in the zone for varying the rate of fertilizer movement through the zone.

21. The method of according to claim 17 including the step of defining a second zone for movement of fertilizer through the growth media.

22. The method of claim 17 wherein the containing step includes using fabric as the porous member.

23. The method of claim 17 wherein the containing step includes using growth media as the porous member.

* * * * *

UNITED STATES PATENT AND TRADEMARK OFFICE
CERTIFICATE OF CORRECTION

PATENT NO. : 5,212,904

DATED : May 25, 1993

INVENTOR(S) : James L. Green, Bruce A. Briggs, Doris L. Briggs

It is certified that error appears in the above-indentified patent and that said Letters Patent is hereby corrected as shown below:

Title page, item [63], "December 4, 1989" should read --December 4, 1990--;

Column 1, line 5, "1989" should be --1990--;

Column 3, line 52, "FIG." should be Figure--;

Column 3, line 53, "3C" should be --30--;

Column 3, line 63, "pathwa.y" should be --pathway--;

Column 4, line 4, "formula&:ions" should be --formulations--;

Column 6, line 31, "polypropylene)" should be --poly(propylene)--;

Column 6, line 62, "projected" should be --protected--;

Column 8, line 40, "FIG." should be --Figure--;

Column 8, line 47, "&hat" should be --that--;

Column 8, line 54, "be&.ween" should be --between--;

Column 8, line 57, "cove:" should be --cover--;

Column 9, line 8, "&:he" should be --the--;

Column 9, line 9, "FIG." should be --Figure--.

UNITED STATES PATENT AND TRADEMARK OFFICE
CERTIFICATE OF CORRECTION

PATENT NO. : 5,212,904
DATED : May 25, 1993
INVENTOR(S) : James L. Green, Bruce A. Briggs, Doris L. Briggs It is certified that error appears in the above-indentified patent and that said Letters Patent is hereby corrected as shown below:

Column 9, line 52, "including" should be --includes--;

Column 10, line 56, "protection" should be --protecting--

Signed and Sealed this

Thirty-first Day of May, 1994

BRUCE LEHMAN

Attest:

Attesting Officer

Commissioner of Patents and Trademarks